United States Patent Office 3,167,032
Patented Jan. 26, 1965

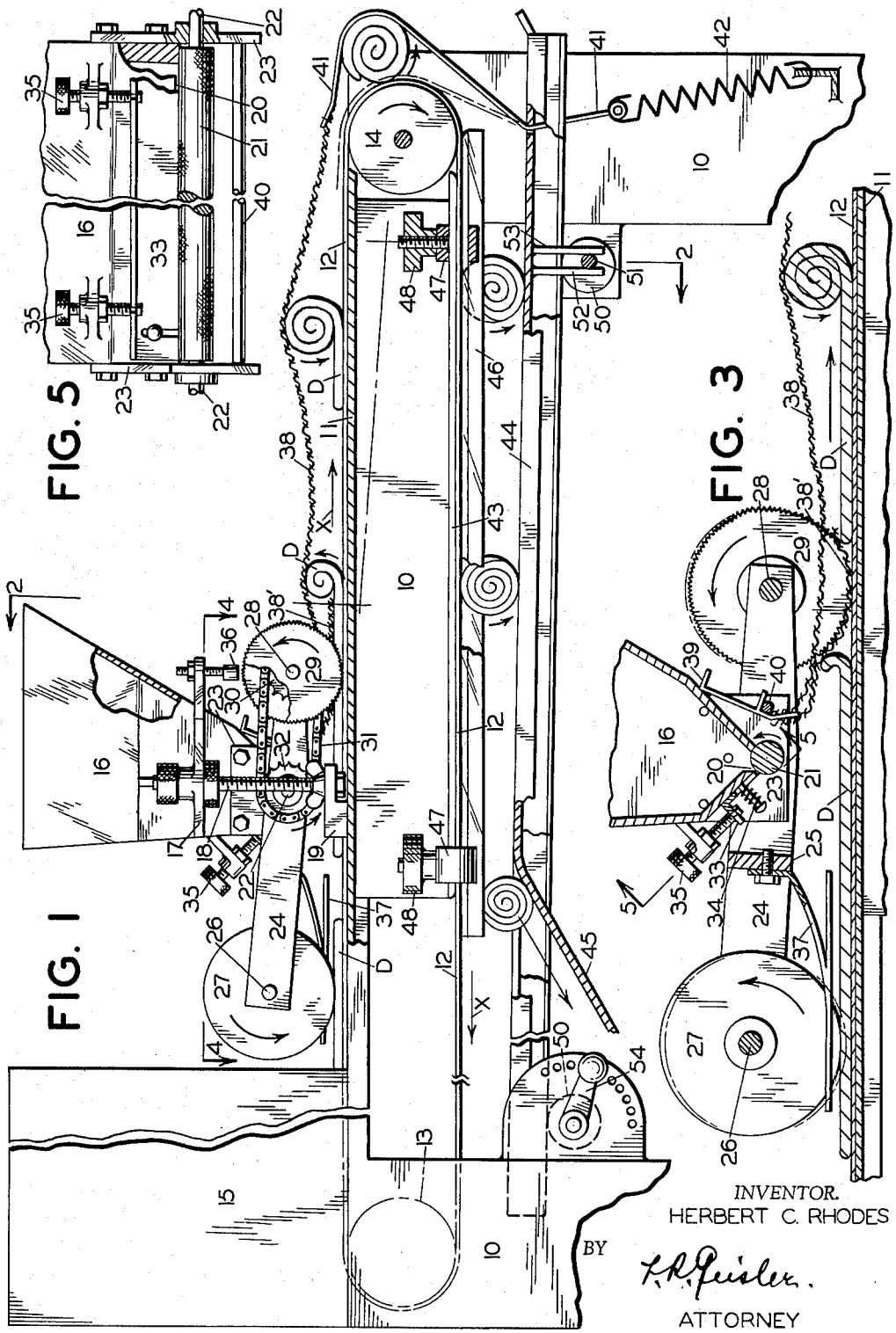

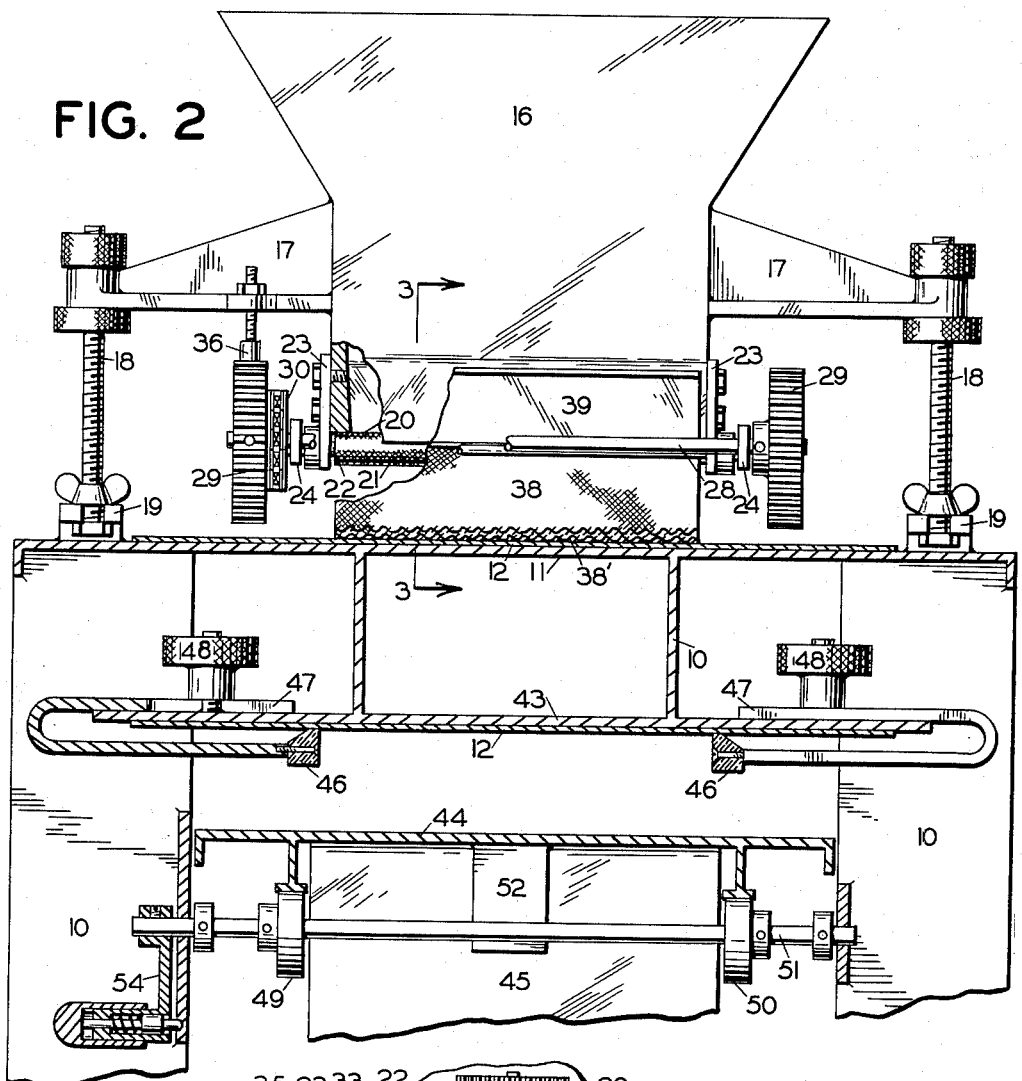
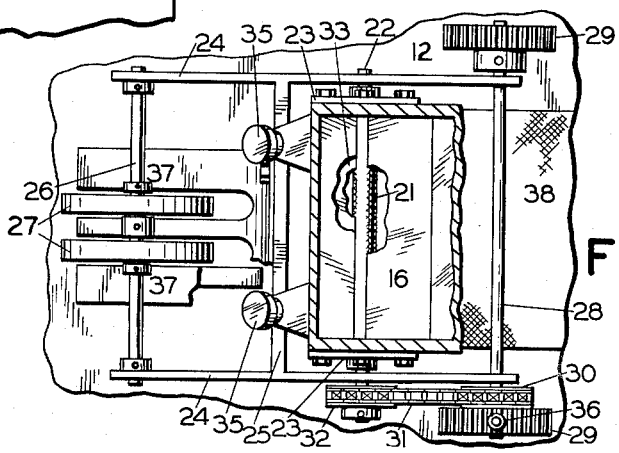

3,167,032
DEVICE FOR AUTOMATICALLY COATING AND ROLLING UP SHEETED DOUGH PIECES
Herbert C. Rhodes, 10106 SE. Stark St., Portland, Oreg.
Filed July 22, 1963, Ser. No. 296,687
9 Claims. (Cl. 107—4)

This invention relates to the placing of coatings on pieces of sheeted dough and the rolling up of the coated pieces in the process of making such familiar bakery products as cinnamon buns and the like.

The well known procedure in such cases is to sprinkle the top face of a piece of sheeted dough with the desired coating, such as cinnamon, sugar etc., and to roll up the coated dough pieces so as to form a roll of proper size and finally to slice the roll transversely into the portions which produce the desired individual buns for baking.

An object of the present invention is to provide an improved machine which will perform the coating and rolling up of the dough pieces automatically.

Various means have heretofore been employed for depositing desired coatings on moving pieces of dough, but such means have not been entirely satisfactory, one of the common faults being that it has not been possible to avoid considerable waste of the coating material and to confine the depositing of the coating to the dough pieces. A specific object of the invention accordingly is to provide an improved, automatically controlled, coating device for dough pieces by which the desired coating will be deposited on each piece successively as it moves through the device and with which only a slight amount of the coating will be deposited beyond the edge of each individual piece.

A further and related object is to provide automatically operating dough coating means which can easily be adjusted for depositing a heavier or lighter coating on each dough sheet.

An additional object of the invention is to provide an improved adjustable machine which will roll up either coated or uncoated individual pieces of dough rapidly as they are delivered and form them into rolls of desired overall size.

A still further object is to provide a machine for coating and rolling up pieces of dough which will be relatively simple in construction, which will operate rapidly and automatically, which can easily be taken apart and cleaned and which will not present any particular maintenance problem.

The manner in which these objects and other incidental advantages are attained with the device of the present invention, the manner in which the different portions of the machine are constructed and adjusted, and the general method of operation, will be briefly described and explained with reference to the accompanying drawings.

In the drawings:

FIG. 1 is a side eleation of the machine with certain portions broken away for clarity;

FIG. 2 is a section on line 2—2 of FIG. 1, drawn to a larger scale, also with certain portions shown broken away;

FIG. 3 is a fragment section on line 3—3 of FIG. 2 drawn to a still slightly larger scale;

FIG. 4 is a fragmentary section on line 4—4 of FIG. 1; and

FIG. 5 is a fragmentary section on line 5—5 of FIG. 3.

Referring first to FIG. 1, the device includes suitable frame construction, indicated in general by the reference 10, which supports the top deck 11 over which an endless traveling belt 12 passes. The belt 12 passes around rollers 13 and 14 at the ends of its course, one of which rollers, preferably the one indicated by the broken lines 13 in FIG. 1, is driven. The belt 12 travels in the direction indicated by the arrows X in FIG. 1 and is made of canvas or other material suitable for engaging and moving pieces of dough delivered upon it.

The dough pieces D of uniform predetermined size are delivered onto the conveyor belt 12 at the left, as viewed in FIG. 1, from suitable dough sheeting rolls mounted in a housing indicated at 15. These dough sheeting rolls are not shown since they are standard and well known equipment.

A hopper 16, for the coating material, (for example cinnamon, and sugar) is supported in spaced position above the deck 11 and the conveyor belt 12. The hopper has a pair of bracket arms 17 (FIG. 2) at opposite sides respectively, each of which is adjustably mounted on a supporting rod 18. The bottom of each supporting rod 18 has a suitable head which, in combination with a clamping nut, is removably clamped in a socket 19 which is welded or otherwise rigidly secured at the respective side of the top deck 11. The front and rear walls of the hopper converge towards each other at the bottom (as shown in FIG. 3) to provide a transversely extending bottom discharge slot 20, the discharge through which takes place with the cooperation of a knurled small diameter dispersing roller 21. This dispersing roller 21 is secured on a shaft 22 which is rotatably supported in a pair of side plates 23 secured on opposite sides of the hopper 16.

A rocking frame comprising a pair of parallel side bars 24 located on the outside of the side plates 23 respectively at opposite sides of the bottom of the hopper and rigidly connected together by an integral cross bar 25 (FIG. 3), is pivotally mounted on the outer ends of the shaft 22 of the dispersing roller 21. A shaft 26, extending across the rear end of this rocking frame, (thus across the end nearest to the pieces of dough as they are delivered onto the conveyor belt 12) carries a pair of freely rotating wheels 27. These wheels are spaced only a short distance apart and are centrally located so that they will always be engaged by each piece of dough as it moves along on the belt 12.

A second shaft 28 is rotatably supported in the forward ends of the side bars 24 of the rocking frame. A second pair of wheels 29 are secured on the ends respectively on the shaft 28. These forward wheels 29 are of smaller diameter than the rear wheels 27 and, unlike the rear wheels, are spaced so far apart that they will not be encountered by the pieces of dough moving along on the belt 12. The rear wheels 27 preferably are formed of Teflon, or other suitable plastic material which will not stick to the dough pieces and have smooth peripheries. The forward wheels 29, on the contrary, may be made of any suitable material including metal and preferably have their peripheries roughened or knurled so that they will be driven positively by their contact with the moving belt 12. The diameters of the forward and rear pairs of wheels 29 and 27 and the spacing of the shaft 22, on which the rocking frame assembly is mounted above the belt and deck 11, are so arranged that the rear pair of wheels and forward pair of wheels will not contact the traveling belt at the same moment. Furthermore the rocking frame assembly is so arranged that the rear portion carrying the wheels 27 will overbalance the forward portion carrying the wheels 29. Thus the rear wheels 27 will normally rest on the traveling belt 12, except when encountered by the dough pieces, while the forward wheels will be held out of contact with the belt 12 except when the rear wheels are raised. When the rear wheels 27 are encountered by a moving piece of sheeted dough, and thus are raised slightly from the belt 12, the forward wheels 29 will momentarily be brought down into contact with the belt and during such time the forward wheels will be rotated by their contact with the belt 12.

A sprocket 30 (FIGS. 1 and 2) is secured on the forward shaft 28 on the inside of one of the forward wheels 29 and thus is rotated whenever the forward wheels rotate. A sprocket chain 31 connects the sprocket 30 with a sprocket 32 (FIG. 1) secured on the shaft 22 for the dispersing roller 21. Consequently whenever the forward wheels 29 are moved down into contact with the moving belt 12, and thus are rotated, the dispersing roller 21 will be rotated and will cause the material from the hopper 16 to be distributed downwardly.

As will be apparent from FIG. 1, whenever a sheeted dough piece D starts to move under the rear wheels 27, the slight raising of these wheels causes the forward wheels 29 to be brought into engagement with the belt 12 and results in the operation of the dispersing roller 21, and by the time the moving piece of dough starts to pass beneath the bottom of the hopper 16 the material from the hopper will be dropping from the rotating dispersing roller 21. Subsequently the passing of the dough piece beyond the rear wheels 27 causes the rear wheels to be lowered and the forward wheels to be raised and the dropping of the material from the dispersing roller 21 will cease, and, by the time this becomes effective, the rear end of the dough piece will be approximately beneath the dispersing roller. In this way the dispersing of the material from the hopper is restricted substantially to each dough piece moving beneath the hopper.

For the purpose of preventing any overrunning of the forward wheels 29 when they are lifted from the belt 12 in the rapid operation of the assembly, which overrunning would cause the dispersing of the material from the hopper to continue longer than necessary, an adjustable brake 36 is provided for one of the forward wheels (FIG. 2). This brake consists of a threaded stem adjustably mounted on the hopper and having a wheel-engaging element at the bottom end, the engaging element being preferably of rubber or other suitable material which will have desired frictional engagement with the wheel whenever the wheel returns to normal raised position and thereupon immediately stop any further rotation or coasting of the wheels and therewith rotation of the dispersing roller 21.

In order to regulate the flow of the material from the hopper when the dispersing roller 21 is rotated, a control slide 33 (FIG. 3) is adjustably mounted on the bottom face of the rear converging wall of the hopper and is normally held in place against the wall and against the dispersing roller by a spring 34. The positioning of the slide 33 is controlled by a pair of thumb screws 35.

For preventing any possibility of the dough sticking to the rear wheels 27 or being partially lifted by the wheels, spring fingers 37 are positioned adjacent the face of the wheels 27 and are supported by the cross bar 25, as shown in FIG. 3.

In order to form the coated pieces of dough into rolls as they pass from beneath the hopper assembly an elongated sheet of coarse metal screen 38, or other suitable material for engaging the top of the dough, extends forwardly from the hopper above the belt 12. This dough-engaging sheet 38 is attached near one end to a plate 39 (FIG. 3) which is rockably carried on a bar 40, the ends of the bar 40 being mounted in the side plates 23 of the hopper assembly. A short loose end portion 38' of this sheet extends forwardly from the plate 39 beneath the main portion of the sheet 38. The other or forward end of the main portion of the dough-engaging sheet 38 (FIG. 1) is attached to a wide band 41 of canvas or other suitable material which extends down over the belt 12 as it passes around the end roller 14 and is anchored to a rod attached to a coil spring 42.

The traveling belt 12 passes around the end roller 14 and moves along over the underside of a stationary lower plate 43 (FIG. 1) of the deck assembly. A bottom plate 44 is adjustably spaced below the lower plate 43 and the bottom plate 44 has an opening for a discharging slide 45 down which the completed dough rolls pass.

As each coated dough piece D moves out from beneath the hopper assembly it is first engaged by the loose end portion 38' of the roll-forming sheet 38. This causes the dough piece to start rolling up. Even though the main portion of the roll-forming sheet 38 may be temporarily raised by the preceding dough roll the free end portion 38 will nevertheless immediately engage the next dough piece and thus the rolling up of each dough piece starts to take place as soon as the piece moves out from the hopper assembly regardless of the quick succession in which the dough pieces travel. Each dough piece is then engaged by the main portion of the roll-forming sheet 38 and the rolling of the dough piece continues, as illustrated in FIG. 1. As the dough roll reaches the end of the top deck 11 it moves under the spring-tensioned strip 41 which holds the dough roll against the belt 12 as the latter passes around the end roller 14. Then when the dough roll reaches the bottom plate 44 it continues to be engaged (at the top now) by the belt 12 and thus continues to be rolled along by the belt 12 until it reaches the discharging slide 45.

In order to define and form the ends of each dough roll the lower plate 43 is provided with a pair of end-forming side bars 46 (FIG. 2) extending along on opposite sides respectively. These bars are supported by pairs of U-shaped brackets 47 which are adjustably mounted on the lower plate 43 by clamping screw means 48 extending through slots in the brackets.

In addition to having the final dough rolls conform to a desired length, with the ends properly evened, it is also desirable to have the diameter of the rolls brought down to a uniform predetermined size. For accomplishing this the bottom plate 44, along which the dough rolls pass in their last stage of formation, is adjustable vertically so that the spacing between the bottom plate 44 and the belt 12 (and underside of the plate 43), can be adjusted accordingly.

Each end of the bottom plate 44 is separately and independently mounted for vertical adjustment and thus the discharging end (or left hand end of the bottom plate 44 as viewed in FIG. 1) may preferably be spaced somewhat closer to the belt 12 and plate 43 than the opposite or intake end. Each end of the bottom plate 43 is supported on a pair of identical cams 49 and 50 (FIG. 2) secured on a cross shaft 51 which is rotatably mounted in side plates on the base frame 10. A pair of parallel fingers 52 and 53, rigidly secured to the plate 44, extend down over opposite faces of the shaft 51 to prevent any longitudinal movement of the plate 44. A crank 54 is secured to an end of the shaft 51 for rotating the shaft and therewith the cams 49 and 50. The crank 54 is equipped with suitable means for locking it in desired position. Since both ends of the bottom plate 44 are adjustably supported in the same manner it suffices to describe this mounting means at one end only.

Thus with the combined assembly, each dough piece receives a desired coating, without excessive waste of the coating material taking place, each coated dough piece is rolled up into a roll of desired length and desired final diameter, with smoothly formed ends on the roll, and all of this takes place automatically as the dough pieces are moved along through the assembly by the endless traveling belt.

I claim:
1. In a device for automatically coating sheeted dough pieces, a main supporting frame, a top deck on said frame, an endless conveyor belt moving along over said top deck, a dough sheeting roll assembly delivering sheeted dough pieces separately consecutively onto said conveyor belt, a hopper, supports positioning said hopper spaced above said deck and conveyor belt, said hopper provided with a bottom slot, a rotatable dispersing roller causing discharge of material from said hopper slot when said roller is rotated, means operable upon contact with said belt for rotating said dispersing roller, and means actuated by engagement with each dough piece on said belt for bringing said first mentioned means into operating contact with said belt during the pasasge of the dough piece through an area below said hopper.

2. In a device for automatically coating sheeted dough pieces, a main supporting frame, a top deck on said frame, an endless conveyor belt moving along over said top deck, a dough sheeting roll assembly delivering sheeted dough pieces separately consecutively onto said conveyor belt, a hopper, supports positioning said hopper spaced above said deck and conveyor belt, said hopper provided with a bottom slot, a dispersing roller secured on a shaft rotatably mounted on said hopper and causing discharge of material from said hopper slot when said roller is rotated, a frame rockably supported on said roller shaft and extending rearwardly and forwardly from said hopper with respect to the direction of travel of said belt, a rear wheel mounted near the rear end of said frame and centrally positioned on said belt, said rear wheel normally resting on said belt, a forward wheel mounted near the forward end of said frame and located above one side of said belt, said forward wheel normally spaced a distance above said belt equal approximately to the thickness of the dough pieces, whereby when said rear wheel is raised by engagement with a traveling dough piece said forward wheel will momentarily be brought down into contact with said belt and rotated thereby, and means connecting said forward wheel with said dispersing roller.

3. In a device for automatically coating sheeted dough pieces, a main supporting frame, a top deck on said frame, an endless conveyor belt moving along over said top deck, a dough sheeting roll assembly delivering sheeted dough pieces separately consecutively onto said conveyor belt, a hopper, supports positioning said hopper spaced above said deck and conveyor belt, said hopper provided with a bottom slot, a dispersing roller secured on a shaft rotatably mounted on said hopper and causing discharge of material from said hopper slot when said roller is rotated, a control slide adjacent said roller for controlling the rate at which material is dispersed by the rotation of said roller, adjustment elements for said slide, a frame rockably supported on said roller shaft and extending rearwardly and forwardly from said hopped with respect to the direction of travel of said belt, a pair of rear wheels mounted near the rear end of said frame and centrally positioned on said belt, said rear wheels normally resting on said belt, a pair of forward wheels mounted near the forward end of said frame and located above opposite sides of said belt respectively, said forward wheels normally spaced a distance above said belt equal approximately to the thickness of said dough pieces, whereby when said rear wheels are raised by engagement with a traveling dough piece said forward wheels will be momentarily brought down into contact with said belt and rotated thereby, and means connecting one of said forward wheels with said dispersing roller.

4. In a device for automatically coating and rolling up sheeted dough pieces, a main supporting frame, a top deck on said frame, an endless conveyor belt moving along over said top deck, a dough sheeting roll assembly delivering sheeted dough pieces separately consecutively onto said conveyor belt, a hopper, supports positioning said hopped spaced above said deck and conveyor belt, said hopper provided with a bottom slot, a rotatably dispersing roller discharge of material from said hopper slot when said roller is rotated, means operable upon contact with said belt for rotating said dispersing roller, means actuated by engagement with each dough piece on said belt for bringing said first mentioned means into operating contact with said belt during the passage of the dough piece through an area below said hopper, a dough-engaging strip having a main portion extending forwardly from said hopper over said belt, a short section of said strip extending freely from said hopped beneath said main portion, and tensioning means connected with the forward end of said main portion of said strip.

5. In a device for automatically coating and rolling up sheeted dough pieces, a main supporting frame, a top deck on said frame, a lower plate spaced below said deck, a bottom plate positioned below said lower plate, an endless conveyor belt moving along over said top deck and around a roll at the front end of said top deck and in reverse direction under said lower plate, a dough sheeting roll assembly delivering sheeted dough pieces separately consecutively onto said conveyor belt and top deck, a hopper, supports positioning said hopped spaced above said deck and conveyor belt, said hopper provided with a bottom slot, a rotatable dispersing roller causing discharge of material from said hopper slot when said roller is rotated, means operable upon contact with said belt for rotating said dispersing roller, means actuated by engagement with each dough piece on said belt for bringing said first mentioned means into operating contact with said belt during the passage of the dough piece through an area below said hopper, a dough-engaging strip extending forwardly from said hopper over said belt, and a tensioning band connected to the forward end of said strip and extending down over said belt and said front roll for said belt, whereby a dough piece rolled up between said belt and said dough-engaging strip will pass down over said front roll and between said belt and said tensioning band and be delivered onto said bottom plate for continuing its travel between said bottom plate and said belt and lower plate.

6. The combination set forth in claim 5 with the addition of a pair of roll end forming side bars mounted on the sides of said lower plate respectively and adjusting means for said side bars.

7. The combination set forth in claim 5 with the addition of adjustable supporting means for each end of said bottom plate, whereby the spacing between said bottom plate and said belt and lower plate may be adjusted for reducing the rolled-up dough piece down to the final desired diameter.

8. A device for automatically coating and rolling up sheeted dough pieces including a main supporting frame, a top deck on said frame, a lower plate spaced below said deck, a bottom plate positioned below said lower plate, an endless conveyor belt moving along over said top deck and around a roll at the front end of said top deck and in reverse direction under said lower plate, a dough sheeting roll assembly delivering sheeted dough pieces separately consecutively onto said conveyor belt and top deck, a hopper, supports positioning said hopper spaced above said deck and conveyor belt, said hopper provided with a bottom slot, a dispersing roller secured on a shaft rotatably mounted on said hopper and causing discharge of material from said hopper slot when said roller is rotated, a frame rockably supported on said roller shaft and extending rearwardly and forwardly from said hopper with respect to the direction of travel of said belt, a pair of rear wheels mounted near the rear end of said frame and centrally positioned on said belt, said rear wheel normally resting on said belt, a pair of forward wheels mounted near the forward end of said frame and located above opposite sides of said belt respectively, said forward wheels normally spaced a distance above said belt equal approximately to the thickness of said dough pieces, whereby when said rear wheels are raised by engagement with a traveling dough piece said forward wheels will momentarily be brought down into contact with said belt and rotated thereby, means connecting one of said forward wheels with said dispersing roller, a dough-engaging strip extending forwardly from said hopper over said belt, a tensioning band connected to the forward end of said strip and extending down over said belt and said front roll for said belt, whereby a dough piece rolled up between said belt and said dough-engaging strip will pass down over said front roll and between said belt and said tensioning band and be delivered on to said bottom plate for continuing its travel between said bottom plate and said belt and lower plate.

9. The combination set forth in claim 8 with the addition of a pair of roll end forming side bars adjustably mounted on the sides of said lower plate respectively and adjustable supporting means for each end of said bottom plate, whereby the spacing between said bottom plate and said belt and lower plate may be adjusted for reducing the rolled-up dough piece down to the final desired diameter.

References Cited in the file of this patent
UNITED STATES PATENTS

| | | |
|---|---|---|
| 2,066,899 | Parsons | Jan. 5, 1937 |
| 2,450,033 | Cohen | Sept. 28, 1948 |
| 2,620,767 | Lehman | Dec. 9, 1952 |
| 2,725,019 | Austin | Nov. 29, 1955 |
| 2,907,285 | Anetsberger | Oct. 6, 1959 |